Feb. 22, 1927.
A. S. HOWELL
1,618,590
FILM REEL GUARD
Filed May 27, 1925
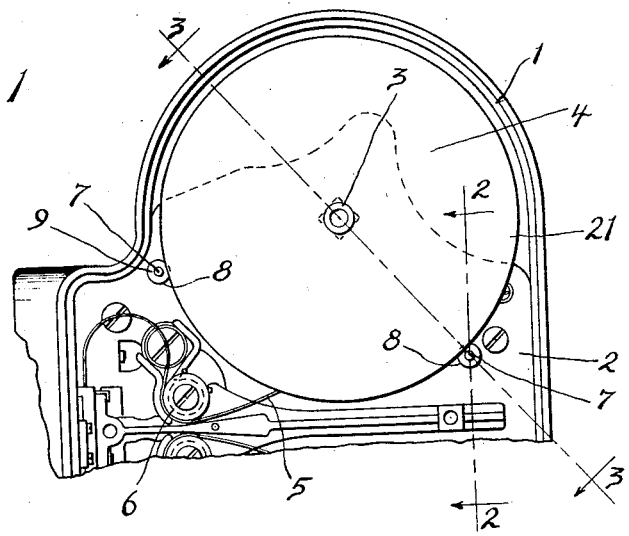
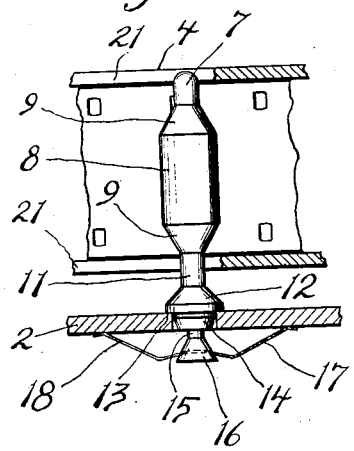
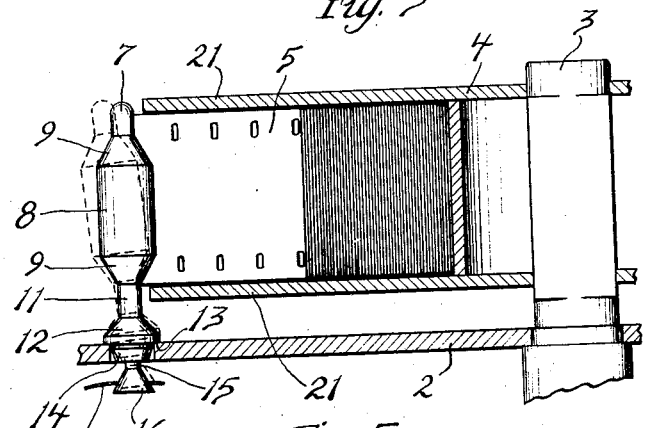
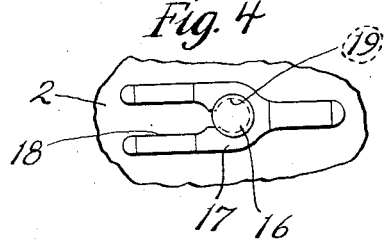
Inventor
Albert S. Howell
By Miehle & Miehle
Atty's

Patented Feb. 22, 1927.

1,618,590

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

FILM-REEL GUARD.

Application filed May 27, 1925. Serial No. 33,246.

One of the features of my invention relates to the provision of an effective film guard for preventing a motion picture film or the like from riding over the peripheries of the flanges of a film reel on which the film is wound or from which the film is fed.

Another feature relates to the provision of a simple and effective guard of the above described character which is adapted for permitting axial mounting and dismounting of the reel, and which preferably requires no attention or manipulation in the mounting or dismounting of the reel.

Another feature relates to a simple and effective film guard mounting which permits universal pivotal movement of the guard and which yieldably urges and maintains the guard in a predetermined position.

With these features in view my invention consists in certain features of novelty in the construction, combination, and arrangement of parts by which the said features and certain other features, hereinafter appearing, are effected, all as fully described with reference to the accompanying drawing and more particularly pointed out in the appended claims.

In the said drawing—

Figure 1 is a partial side view of a motion picture camera embodying my invention with the cover or door thereof removed.

Figure 2 is an enlarged partial section on the line 2—2 of Fig. 1.

Figure 3 is an enlarged partial section on the line 3—3 of Fig. 1.

Figure 4 is an enlarged partial interior view taken oppositely with respect to Fig. 1.

Figure 5 is an enlarged plan view of the spring involved in the structure.

Figure 6 is a side elevation of this spring.

Like characters of reference indicate like parts in the various views.

Referring to the drawing and particularly Fig. 1, 1 designates a camera casing open at one side, which side is closed by a door or cover, not shown, removably attached to the casing. Secured in the casing is a mechanism frame including an outer frame plate 2 which is disposed inwardly of the open side of the casing and in parallelism with the plane of the open side. Revolubly mounted on the mechanism frame on an axis normal to the plane of the frame plate and projecting outwardly therefrom is a film reel spindle 3 which is adapted for the mounting and dismounting of a flanged film reel 4 thereon by axial movement of the reel over the projecting end thereof, the reel being retained against axial movement on the spindle when mounted thereon by the formation of the spindle and the door or cover of the casing, not shown, in a manner not pertinent to my present invention.

A film 5 wound on the reel is fed therefrom in the operation of the camera by means of film feeding mechanism generally indicated at 6 and is subsequently wound on another reel, not shown, in the camera.

The film guard of my invention consists as follows. A film guard stud, generally indicated at 7, is provided with a large round guard portion 8, longitudinal cam portions 9, shown in frusto-conical form, at the ends of the guard portion and merging therewith and reducing in directions away therefrom, a mounting portion at the inner end of the stud and a relatively small clearance portion 11 between the mounting portion and the adjacent cam portion 9. See Figs. 2 and 3. The aforesaid mounting portion consists of a large portion 12 adjacent the clearance portion 11 and forming an axially facing shoulder 13 facing in the direction away from the guard portion 8. Immediately beyond this shoulder is a radial bearing portion 14 followed by a small connecting portion 15 and finally at the inner end of the stud a frusto-conical head formation 16 having its base at the extreme inner end of the stud. The mounting portion of the stud passes through an aperture of the frame plate 2 which aperture is engaged by the radial bearing portion 14 which is shaped to permit universal pivotal movement of the stud. The shoulder 13 engages the outer surface of the frame plate 2 about the said aperture in the plate and limits inward movement of the stud and forms a bearing with the frame plate on which the stud is tilted in its universal pivotal movement, the radial bearing portion 14 of the stud limiting lateral movement of the stud at the frame plate. A bow spring 17 of flat stock, see Figs. 2, 4, 5, and 6, is slotted from one end to an intermediate point thereof, as designated at 18, and has the inner end of the slot in the form of an interrupted circle as designated at 19. In the assembly of the film guard on the frame plate and after the mounting portion of the guard stud is passed through the aperture of the frame plate the spring 17 is positioned on the inner face of the frame plate with the ends of the spring engaged thereagainst and is moved longitudinally in the direction in which the outer end of the slot 18 thereof faces with the head formation 16 in the slot until the interrupted circular formation 19 is under the head formation. The spring is then released and the circular formation engages the conical surface of the head to retain the spring and stud in place as is obvious. As thus assembled the spring yieldably urges the stud axially in the direction in which the shoulder 13 faces. As a result the guard stud is yieldably urged into and maintained in an upright position by reason of the cooperation of the spring 17 with the shoulder 13, the spring permitting universal pivotal movement of the stud.

The aperture in the frame plate 2 is so positioned that when the guard stud 7 is in its upright position the guard portion 8 thereof projects at the periphery of the reel inwardly between the flanges 21 thereof, as shown in Figs. 1 and 3, the small clearance portion 11 of the guard stud clearing in inner flange of the reel. Thus the film on the reel is effectually prevented from riding over the flanges by reason of the fact that it is retained within the flanges. As shown in Fig. 1 two such guards are shown in association with the reel and mounting thereof.

As aforesaid the reel 4 is mounted on or dismounted from the spindle 3 by axial movement of the reel over the projecting end of the spindle. This axial movement of the reel causes the inner flange 21 of the reel to engage one or the other of the cam portions 9 of the guard studs, depending on whether the reel is being mounted or dismounted, and tilts the guard studs outwardly to clear the inner flange whereby the reel may be mounted or dismounted without attention to or manipulation of the guard studs. The tilted or reel clearing position of the guard stud is shown in dotted lines in Fig. 3.
While I have described and shown the preferred embodiment of my invention I do not wish to be limited to the precise details of construction as changes may readily be made without departing from the spirit of my invention, but having thus described my invention, I claim as new and desire to secure by Letters Patent the following:—

1. The combination with a projecting film reel spindle adapted for the mounting and dismounting of a revoluble film reel thereon by axial movement of the reel over the projecting end thereof, of a movably mounted film guard spring pressed into a position to project at the periphery of a flanged reel mounted on said spindle inwardly into the space between the reel flanges and adapted for movement out of said projecting position to permit mounting and dismounting of the reel, and cam portions on said guard adapted for engagement with the periphery of one of said reel flanges for moving the guard out of said projecting position with axial mounting and dismounting movement of the reel.

2. In a film guard the combination with a frame member provided with an aperture, of a film guard stud passing through said aperture and adapted for universal pivotal movement therein, an axially facing shoulder on the stud at one side of said frame member and engaging the surface thereof about said aperture, and spring means engaged with the stud on the opposite side of the frame member and adapted to yieldably urge the stud axially in the direction in which said shoulder faces and permitting universal pivotal movement of the stud.

3. In a film guard the combination with a frame member provided with an aperture, of a film guard stud passing through said aperture and adapted for universal pivotal movement therein, an axially facing shoulder on the stud at one side of said frame member and engaging the surface thereof about said aperture, a head formation on the stud disposed on the opposite side of the frame member and adapted to pass through said aperture, and a slotted bow spring of flat stock engaged at an intermediate point thereof by means of the slot thereof under said head formation and engaging the frame member with the end portions thereof for yieldably urging the stud axially in the direction in which said shoulder faces.

4. In a film guard the combination with a frame plate provided with an aperture, of a film guard stud passing through said aperture and adapted for universal pivotal movement therein, an axially facing shoulder on the stud at one side of said frame plate and engaging the surface thereof about said aperture, a frusto-conical head formation on the stud disposed on the opposite side of said plate with its base farthest from said plate, and a bow spring of flat stock slotted from one end to an intermediate point thereof for assembly under the head formation and having the inner end of the slot in the form of an interrupted circle to engage the conical surface of said head formation and retain the spring thereon, the end portions of said spring engaging the frame plate for yieldably urging the stud axially in the direction in which said shoulder faces.

5. In a film guard the combination of a guard stud having a large round guard portion, a mounting portion and a relatively small clearance portion therebetween, and means cooperating with said mounting portion whereby said stud is mounted for universal pivotal movement at said mounting portion and yieldably urged into and maintained in a predetermined position.

6. In a film guard the combination of a guard stud having a large round guard portion, longitudinal cam portions at the ends of said guard portion and merging therewith and reducing in directions away therefrom, a mounting portion at one end and a relatively small clearance portion between the mounting portion and the adjacent cam portion, and means cooperating with said mounting portion whereby said stud is mounted for universal pivotal movement at said mounting portion and yieldably urged into and maintained in a predetermined position.

7. In a film guard the combination with an apertured frame member, of a guard stud having a large round guard portion, a mounting portion and a relatively small clearance portion therebetween, said mounting portion passing through said aperture and adapted for universal pivotal movement therein and having an axially facing shoulder facing in the direction away from said guard portion and engaging the opposing surface of said frame member about said aperture, and spring means engaged with the stud on the side of said frame member opposite that on which said shoulder lies and adapted to yieldably urge the stud axially in the direction in which said shoulder faces and permitting universal pivotal movement of the stud.

8. In a film guard the combination with an apertured frame plate, of a guard stud having a large round guard portion, longitudinal cam portions at the ends of said guard portion and merging therewith and reducing in directions away therefrom, a mounting portion at one end and a relatively small clearance portion between the mounting portion and the adjacent cam portion, said mounting portion passing through said aperture and adapted for universal movement therein and having a large portion adjacent said clearance portion and forming an axially facing shoulder facing in the direction away from said guard portion and engaging the opposing surface of said frame plate about said aperture, said mounting portion also having a head formation disposed on the side of said frame plate opposite that on which said shoulder lies and adapted to pass through said aperture, and a slotted bow spring of flat stock engaged at an intermediate point thereof by means of the slot thereof under said head formation and engaging the frame plate with the end portions thereof for yieldably urging the stud axially in the direction in which said shoulder faces.

9. In a film guard combination with an apertured frame plate, of a guard stud having a large round guard portion, longitudinal cam portions at the ends of said guard portion and merging therewith and reducing in directions away therefrom, a mounting portion at one end and a relatively small clearance portion between the mounting portion and the adjacent cam portion, said mounting portion passing through said aperture and adapted for universal movement therein and having a large portion adjacent said clearance portion and forming an axially facing shoulder facing in the direction away from said guard portion and engaging the opposing surface of said frame plate about said aperture, said mounting portion also having a frusto-conical head formation disposed on the side of said frame plate opposite that on which said shoulder lies and having its base farthest from said plate, and a bow spring of flat stock slotted from one end to an intermediate point thereof for assembly under said head formation and having the inner end of the slot in the form of an interrupted circle to engage the conical surface of the head formation and to retain the spring thereon, the end portions of said spring engaging the frame plate for yieldably urging the stud axially in the direction in which said shoulder faces.

In witness whereof I hereunto affix my signature this 22 day of May, 1925.

ALBERT S. HOWELL.